Jan. 30, 1962  C. H. KIRK, JR  3,018,787
AIR RELIEF DEVICE
Filed Oct. 25, 1960  2 Sheets-Sheet 1
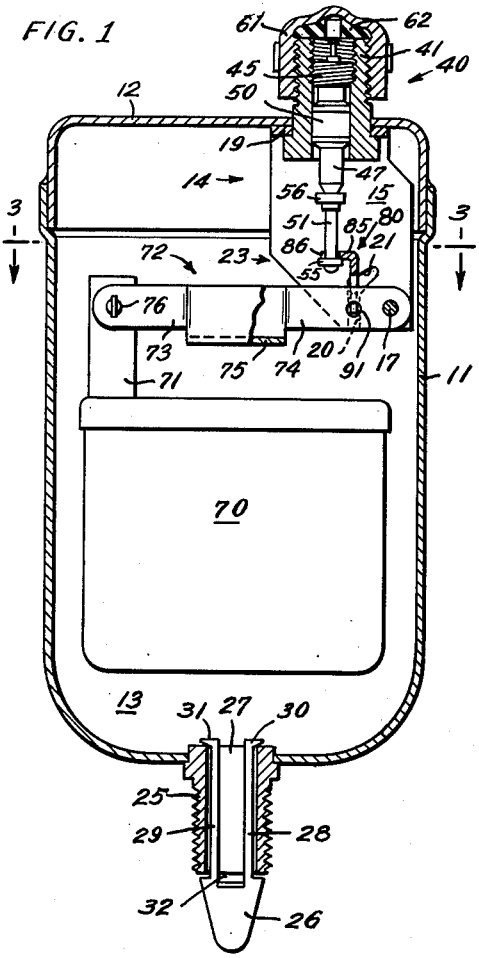
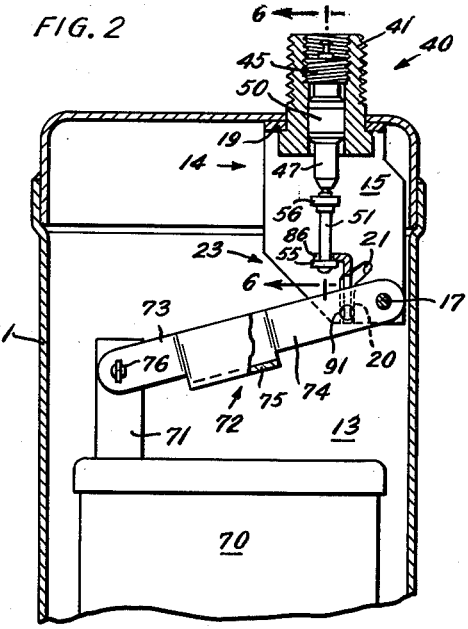
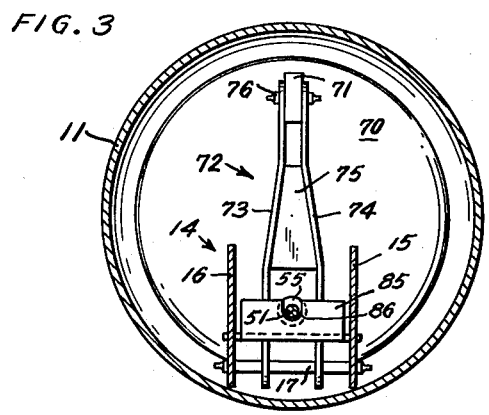
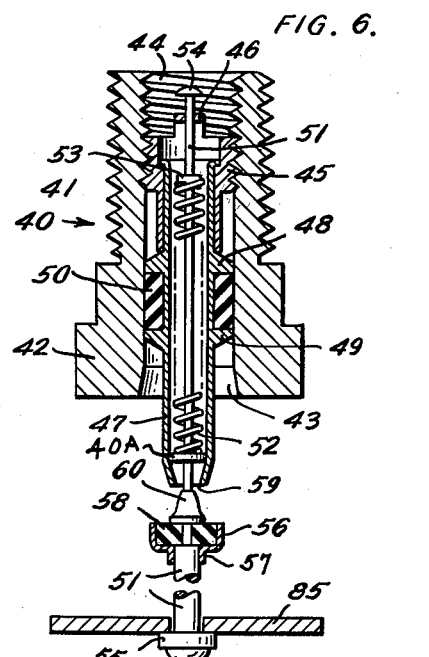
INVENTOR.
CHESTER HOWARD KIRK, JR.,
BY
William Frederick Werner
ATT'Y.

Jan. 30, 1962     C. H. KIRK, JR     3,018,787
AIR RELIEF DEVICE

Filed Oct. 25, 1960     2 Sheets-Sheet 2

INVENTOR.
CHESTER HOWARD KIRK JR.,
BY William Frederick Werner
ATT'Y.

United States Patent Office 3,018,787
Patented Jan. 30, 1962

3,018,787
AIR RELIEF DEVICE
Chester Howard Kirk, Jr., 14 Glen Ave., Cranston, R.I.
Filed Oct. 25, 1960, Ser. No. 64,794
3 Claims. (Cl. 137—202)

This invention relates to air relief devices, and more particularly to air relief devices which automatically vent air from a liquid containing system.

A principal object of the present invention is to provide an improved valve stem actuating lever whereby the valve stem life is materially increased in an air relief device.

The present invention is an improvement over the U.S. patents to W. J. Woolley, numbers 2,633,142 and 2,276,136, which issued on March 31, 1953, and March 10, 1942, respectively.

Another object of the present invention is to provide an air relief device in which the valve may be removed and readily replaced without removing or handling the operating mechanism attached to the valve stem.

And still another object of the present invention is to provide an improved tubular casing or housing for an air relief device.

A further object of the present invention is to provide a novel connection in an air relief device, between a valve unit and a float for controlling the operation of said valve unit, in which the valve unit can be removed from the float for replacement or service, even though the casing is of one piece construction and the valve unit is positively connected to the float at all times when the device is in operation.

Other objects of the present invention will become apparent in part and be pointed out in part in the following specification and claims.

In prior art devices, especially in the patents cited, a lever pivotally mounted to a fixed bracket on one end and pivotally connected to a float on the other end, was directly connected to the valve stem adjacent the fixed pivotal end. The result was that the lever always actuated the valve stem with an arcuate movement. Thereby placing side thrust on the valve stem. The side thrust caused unnecessary friction and wear on the valve stem. Thus the valve stem acted sluggish and wear necessitated early replacement of the valve.

The present construction provides a means of actuating the valve stem in a straight line. Thereby obviating wear, sluggishness and the consequent slow acting, leaky valve.

In the accompanying drawings wherein like reference characters refer to like parts:

FIGURE 1 is a vertical central section of an air relief device embodying the features of the present invention, the valve mechanism being shown in the closed position.

FIGURE 2 is a fragmentary vertical central section of the device of FIGURE 1, showing the valve mechanism in the open position.

FIGURE 3 is a plan view taken in section on the line 3—3 of FIGURE 1.

FIGURE 6 is an enlarged elevational view of the valve unit, taken in section on the line 6—6 of FIGURE 2.

Figure 5:
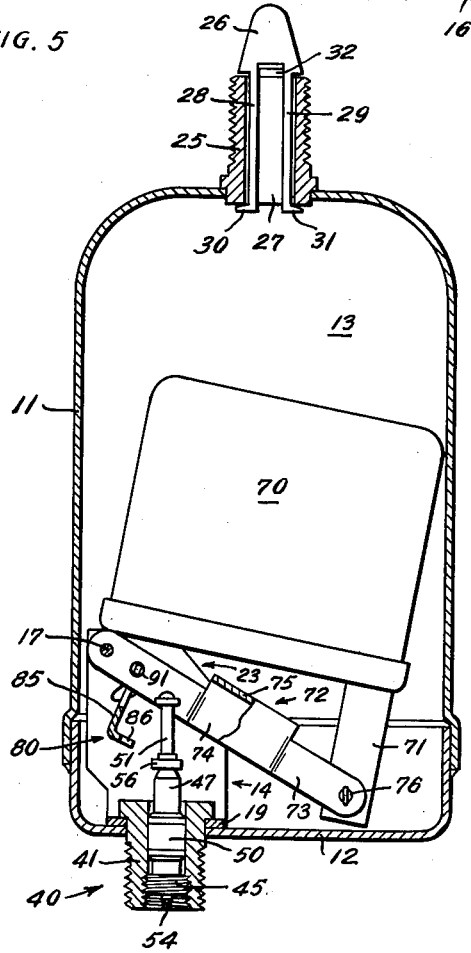
FIGURE 5 is a vertical central section of an air relief device embodying the features of the present invention, the device being inverted when compared to FIGURE 1, illustrating the manner in which the lever is automatically detached from the valve stem.

FIGURES 1 and 5 of the drawings, illustrate a circular casing 11 to which a bonnet 12 is permanently attached, as by means of welding. The resulting chamber 13 has an approximate ratio of diameter to the length of three to five. A bracket, generally indicated at 14, substantially U-shaped, consisting of two parallel sides 15, 16, connected by a base 19, is secured to the interior surface of the bonnet 12, as by welding. The parallel sides 15, 16 of U-shaped bracket 14 are provided with oppositely located bearings which support a pin 17. Sides 15, 16 are provided with oppositely located and parallel slits, consisting, as viewed in FIGURES 1 and 2 of vertical paths 20 terminating in a base area 21 located at an angle of forty-five degrees to the vertical paths 20. Sides 15, 16 are provided with oppositely located and parallel tapers, as indicated generally at 23 for clearance purposes as will hereinafter appear.

The lower end of the circular casing 11 is provided with a threaded pipe fitting 25, whereby the circular casing 11 may be coupled to a liquid containing system. A tongue-shaped member 26 is suspended in the opening 27 of the fitting 25, and is shown in FIGURE 1 to comprise two leg portions 28, 29 suspended by the tab portions 30, 31, respectively, and a tab 32 extending outwardly from between the leg portions 28, 29, at the lower end of said member 26.

A valve unit, designated generally by the numeral 40, extends through the bonnet 12 and the bracket 14. As best shown in FIGURE 6, the valve unit 40 comprises a threaded casing 41 having a circumferential flange 42 which seats against the bracket 14. The bore 43 of the casing 41 is threaded at 44 to receive the hollow nut 45, said nut 45 being provided with a guide portion 46 whereby the nut 45 may be turned for adjusting its position along the bore 43, for purposes which will presently appear. A valve sleeve 47 is supported at its upper end portion by the hollow nut 45 and extends into the interior of the casing 11. The valve sleeve 47 includes a pair of flanges 48 and 49 between which is retained a packing member 50 of resilient material such as rubber. Said packing member providing a hermetically sealed connection between the casing 41 and the valve sleeve 47.

A valve stem 51 is positioned within the valve sleeve 47 and is urged upwardly by the spring 52 which bears against the collar 40A. The head 54 on the upper end of the valve stem 51, together with the guide portion 46 of the nut 45, acts as a stop limiting the downward movement of the valve stem 51. The lower end of the valve stem 51 is provided with a shoulder portion 55 and a cup shaped sleeve 56 which is secured to the stem 51 by the neck portion 57. The concave side of the sleeve 56 retains and supports a packing member 58 which may for example be a neoprene washer. The packing member 58 faces the valve seat 59 comprising the lower end of the valve sleeve 47, and is adapted for movement against said valve seat 59. Also secured to the valve stem 51 is a tapered guide member 60, which insures a positive and accurate seating between the packing member 58 and the valve seat 59. The guide member 60 is preferably secured to the valve stem 51 in such fashion as to press downwardly upon the packing member 58, to insure a hermetical seal between said packing member 58 and the valve stem 51.

As shown in FIGURES 1 and 2, a cap 61 having a washer 62 therein, may be screwed down upon the upper end of the casing 41, for purposes which will presently appear.

A float 70 having a projection 71 secured to the top thereof, as viewed in FIGURES 1 and 2, is located in chamber 13 and is adapted for movement therein, as will presently appear.

A float lever, generally indicated by numeral 72, is provided consisting of two upright parallel sides 73, 74 integrally connected by a cross member 75. A pintle 76 pivotally connects one end of float lever 72 to projection 71. Pin 17 pivotally connects float lever 72 to bracket 14.

Figure 4:
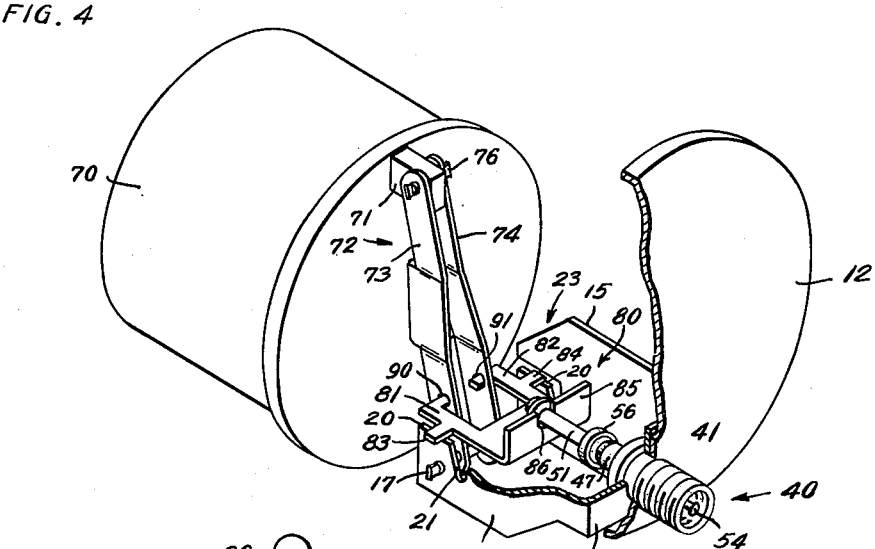
FIGURE 4 is a perspective view, partly in section, illustrating the float, valve and the lever connecting the float to the valve.

An actuator, generally indicated by reference numeral 80, (see FIGURES 1, 4 and 5) is provided consisting of a U-shaped member having legs 81, 82, the ends of which are bent at right angles toward each other to form fulcrum projections. Leg 81 is provided with an ear 83. Leg 82 is provided with an oppositely located similar ear 84. A shoulder 85 is formed on one end of actuator 80 in the form of a right angle bend. A slot 86 in shoulder 85 is adapted to engage and disengage valve stem 51.

The fulcrum projections formed by the ends of legs 81, 82 engage fulcrum bearings 90, 91 respectively, located in parallel sides 73, 74, respectively. Ears 83, 84 are located in the vertical paths 20 which are sufficiently wide to permit sides 15, 16 to guide the movement of actuator 80 in a straight line without binding.

It will be noted that the valve stem 51 is located midway between and parallel to parallel sides 15, 16. Slot 86 is in axial alignment with valve stem 51 during normal movement of float 70.

In operation, the instant air relief device is first connected to a liquid containing system, which for example may be a hot water radiator, or the like. The cap 61 may be screwed down tightly upon the casing 41. Thus the device is substantially hermetically sealed even though the valve unit 40 is held in the open position by the weight of the float 70. The system is then filled, and the cap 61 backed off sufficiently to permit air and gas to vent from the system at a slot rate. Otherwise liquid rushes into chamber 13, and may clog the valve seat 59 and sleeve 47 with dirt and scale. If the rush of liquid is such, so as to cause the liquid to pass through the valve unit 40; the condition is called "spitting." Constructing chamber 13 in a ratio of three to five, width to length, reduces "spitting" to a minimum.

As the rising liquid causes float 70 to rise within the chamber 13 to the position shown in FIGURE 1, the spring 52 closes the packing member 58 against the valve seat 59, thereby closing the valve unit 40.

As the device continues in operation, air and/or gas accumulates within the chamber 13, causing the level of the liquid therein to fall, whereupon the float 70 moves downwardly. As the float 70 displaces downwardly, the float lever 72 pivots about the pin 17, as shown in FIGURE 2. Thus, actuator 80 is moved downwardly in a straight line, due to the guidance of vertical paths 20, pulling valve stem 51 in a straight line downwardly against the resistance of spring 52, even though legs 81, 82 engaging fulcrum bearings 90, 91, respectively move in an arc scribed from the center of pivot pin 17. Pivot pin 17 is located at a point which is equidistant from both the vertical paths 20 and the angular or base areas 21 of the slits. This movement opens the valve unit 40 and vents the air or gas within chamber 13 to the atmosphere, thereby permitting the level of liquid to once again rise in chamber 13 and return float 70 to the position shown in FIGURE 1.

This cycle of operation is repeated indefinitely, to maintain the system free from objectionable air and gas.

Advantageously, the tongue-shaped member 26 provides for positive drainage of chamber 13 at all times, whereby the level of liquid in said chamber 13 follows accurately the level of liquid in the balance of the system. If the tongue-shaped member 26 were not used, there would be a tendency as air or gas accumulates in chamber 13, for the falling level of liquid within chamber 13 to lag somewhat the level of the liquid in the balance of the system. This is especially noticeable when the system is drained, since the flow of liquid through the opening 27 is sluggish and may cease entirely due to the reduced pressure of the air or gas in the upper portion of chamber 13. The member 26 eliminates this undesirable characteristic. The legs 28, 29 counteract the effects of surface tension and provide drain surfaces down which substantially all the liquid flows, while the space between legs 28, 29 serves as a passageway up which air and gas can flow. The tab 32 acts to deflect the downward flow of liquid and to make said flow more turbulent. As the downward flowing liquid strikes tab 32, the member 26 is thereby caused to swing and vibrate, thus making the action of the member 26 even more effective.

A special operating feature of the device results from the construction of float lever 72 and actuator 80 which transmit the force initiated by the float 70 to the enlarged shoulder portion 55 of valve 40. As the float 70 moves downwardly, in relation to bore 43 and casing 41, the valve stem 51 is pulled straight down in an axial direction, rather than to one side. This movement, in an avial direction, substantially eliminates binding of the valve stem 51 on valve sleeve 47, and makes operation of the entire valve unit 40 smoother and more accurate.

By permanently securing the bonnet 12 to the circular casing 11, in the manner described, the manufacture of the device is simplified, the cost is reduced and the mechanism in chamber 13 remains tamper proof. While the float 70 and the supporting mechanism therefore are sealed within chamber 13, the operative parts of valve unit 40 may still be serviced or replaced, notwithstanding the connection between valve stem 51 and actuator 80.

To remove the valve sleeve 47, the device is first uncoupled from the liquid containing system, and turned upside down (see FIGURE 5). The weight of the float 70 causes the float lever 72 to swing toward bonnet 12. As float lever 72 moves past its normal operating limits, ears 83, 84 ride in the parallel slits formed by vertical paths 20 into the base area 21, set at a forty-five degree angle to the vertical. Thus actuator 80, pivotally connected to float lever 72, is caused to swing away from valve stem 51. Thereby removing slot 86 in shoulder 85 from engagement with valve stem 51. The valve sleeve 47 may then be readily removed by unscrewing the hollowing nut 45. Advantageously, the ears 83, 84 are permanently held in the parallel slits so that slot 86 in shoulder 85 can never be misaligned with valve stem 51 should the device be tossed about during the period in which the valve sleeve 47 is being replaced.

It will thus be apparent that I have perfected an air relief device of improved and foolproof construction, which is simple in design, relatively cheap to manufacture and in which the working parts of the valve mechanism are readily removed for replacement or repair.

Having shown and described a preferred embodiment of the present invention by way of example, it should be realized that structural changes could be made and other examples given without departing from either the spirit or scope of this invention.

What I claim is:

1. An air relief valve comprising a circular casing, a bonnet permanently fastened to one end of said casing, means at the other end of said casing for connecting said casing to a liquid containing system, a float, provided with a projection, disposed interiorly of said casing, a bracket having two parallel sides connected by a base, said base secured to the interior surface of said bonnet, a pin secured on opposite ends to said two parallel sides, each parallel side having a slit consisting of a vertical path terminating in a base area located at an angle of forty-five degrees to said vertical path, said pin being equidistant from both said vertical path and said base area, an adjustable, vertically disposed valve sleeve mounted in and extending through said bonnet and the base of said bracket, a valve stem in said valve sleeve having an enlarged shoulder portion in said circular casing, said valve stem located mid-way between and in parallel alignment with said two parallel sides, a float lever a pintle pivotally connecting one end of said float lever to said projection on said float, the other end of said float lever pivotally connected to said pin, an actuator consisting of a member having pivotally connecting said actuator to said float lever, said member having guide means slidably engaging the slit in each parallel side of said bracket, said slits being sufficiently wide to provide free sliding movement for said guide means, said actuator having a shoulder, and means on said shoulder to engage and disengage the shoulder portion of said valve stem upon movement from the upright to the inverted position of said tubular casing.

2. An air relief valve comprising a circular casing, a bonnet permanently fastened to one end of said casing, means at the other end of said casing for connecting said casing to a liquid containing system, a float, having a projection, disposed interiorly of said casing, a bracket having two parallel sides connected by a base, said base secured to the interior surface of said bonnet, a pin secured on opposite ends to said two parallel sides, each parallel side having a slit consisting of a vertical path terminating in a base area located at an angle of forty-five degrees to said vertical path, said pin being equidistant from both said vertical path and said base area, an adjustable, vertically disposed valve sleeve mounted in and extending through said bonnet and the base of said bracket, a valve stem in said valve sleeve having an enlarged shoulder portion in said circular casing, said valve stem normally located in parallel alignment between said two parallel sides, a float lever consisting of two upright parallel sides integrally connected by a cross member, a pintle pivotally connecting one end of said float lever to said projection on said float, the other end of said float lever pivotally connected to said pin, an actuator consisting of a U-shaped member each of the two legs of the U-shaped member having a fulcrum projection bent at right angles to its respective leg, two ears, one on each of said two legs, a shoulder formed in said U-shaped member bent at right angles to said two legs, a slot in said shoulder, said fulcrum projections pivotally mounted respectively, in said two parallel sides of said float lever, said two ears slidably mounted, respectively, in the vertical paths of said parallel slits, said slits being sufficiently wide to provide free sliding movement for said ears; said shoulder portion of said valve stem engageable and disengageable with said slot in the shoulder formed in said U-shaped member, whereby said valve stem may be connected and disconnected to said actuator.

3. An air relief valve comprising a circular casing, a bonnet permanently fastened to one end of said circular casing to form a chamber having an approximate ratio of three to five, diameter to length, means at the other end of said circular casing for connecting said circular casing to a liquid containing system, a float, having a projection located in said chamber, a substantially U-shaped bracket consisting of two parallel sides connected by a base, said base secured to the interior surface of said bonnet, a pin secured on opposite ends to said two parallel sides, each parallel side having a slit consisting of a vertical path terminating in a base area located at an angle of forty-five degrees to said vertical path, said pin being equidistant from both said vertical path and said base area, a removable valve unit extending through said bonnet and the base of said bracket, said valve unit including a valve stem having a shoulder portion in said chamber, said valve stem located mid-way between and in parallel alignment with said two parallel sides, a float lever having two upright parallel sides, a pintle pivotally connecting one end of said float lever to said projection on said float, the other end of said float lever pivotally connected to said pin, an actuator consisting of a U-shaped member each of the two legs of the U-shaped member having a fulcrum projection bent at right angles to its respective leg, two ears, one on each of said two legs, said ears in parallel alignment, a shoulder formed in said U-shaped member bent at right angles to said two legs, said fulcrum projections pivotally mounted, respectively, in said two parallel sides of said float lever, said two ears slidably mounted, respectively, in said parallel slits, said slits being sufficiently wide to provide free sliding movement for said ears; said shoulder portion of said U-shaped member having a slot engageable and disengageable with said shoulder portion of said valve stem and in axial alignment with said valve stem, whereby during normal operation, downward movement of said float opens said valve unit to vent said chamber to the atmosphere and whereby inverting said circular casing causes the slot in the shoulder of said U-shaped member to disengage the shoulder portion of said valve stem through the sliding movement of said ears in said parallel slits.

References Cited in the file of this patent
UNITED STATES PATENTS

| | | |
|---|---|---|
| 2,276,136 | Woolley | Mar. 10, 1942 |
| 2,633,142 | Woolley | Mar. 31, 1953 |